Dec. 1, 1964   P. B. OLSSON   3,159,138
METHOD OF USING A RECORDING DEVICE WITH MECHANICAL MILKERS
Filed March 10, 1961   3 Sheets-Sheet 1

INVENTOR.
Per Börje Olsson
BY Davis, Hoxie, Faithfull & Hapgood
Attorneys

Dec. 1, 1964   P. B. OLSSON   3,159,138
METHOD OF USING A RECORDING DEVICE WITH MECHANICAL MILKERS
Filed March 10, 1961   3 Sheets-Sheet 2

INVENTOR.
Per Börje Olsson
BY
Davis, Hoxie, Faithfull & Hapgood
Attorneys

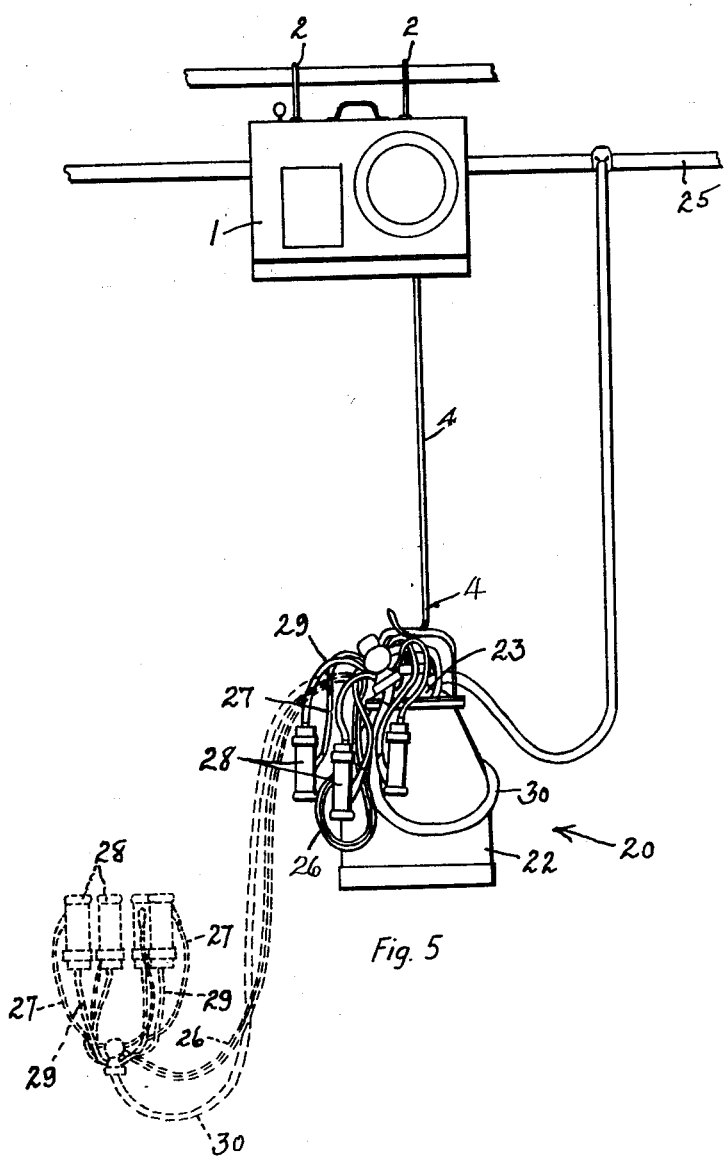

United States Patent Office 3,159,138
Patented Dec. 1, 1964

3,159,138
METHOD OF USING A RECORDING DEVICE WITH MECHANICAL MILKERS
Per Börje Olsson, Hallsta Gard, Hallsta, Sweden, assignor to Aktiebolaget Separator, Stockholm, Sweden, a corporation of Sweden
Filed Mar. 10, 1961, Ser. No. 94,747
Claims priority, application Sweden Mar. 12, 1960
2 Claims. (Cl. 119—14.17)

This invention relates to the mechanical milking of cows and has particular reference to a recording device for use with a mechanical milker to provide a record of the milk-yielding characteristics of the cows served by the mechanical milker. The invention also has reference to a method of using the recording device in such mechanical milking.

A recording device made in accordance with the invention comprises a balance including a load suspending means, such as a hook, for suspending the entire mechanical milking unit made up of the usual milk receptacle, pulsator, teat cups and pipes or hoses connecting the teat cups to the receptacle and the pulsator. The recording device also includes means for feeding a paper sheet through a predetermined path at constant speed, a stylus adapted to form a mark on the sheet, and an operative connection between the balance and stylus through which the latter is movable along the sheet generally transversely of the direction of its feed path in response to variations in the load on the suspending means. Thus, the stylus is adapted to mark on the sheet a curve indicative of the amount and rate of milking by a milking unit mounted on the suspending means except for the teat cups and appurtenant hoses suspended from the cow.

According to the preferred practice of the invention, the entire milking unit is first hung on the balance suspending means, whereupon the sheet is moved along its path to cause the stylus to mark on the sheet a vertical line indicating the total weight of the milking unit and any milk contained therein from a previous milking. The teat cups and appurtenant hoses are then removed from the suspending means and the teat cups are applied to the cow, after which the milking unit is started in operation and operated to effect a substantially complete milking of the cow while the sheet is advanced by its feeding means. Upon completion of the milking operation, the teat cups are removed from the cow and are rehung with their appurtenant hoses on the balance suspending means, whereupon the sheet is again moved a short distance along its path to cause the stylus to mark on the sheet another vertical line indicative of the total weight of the milking unit and the milk contained therein. Thus, the total weight of milk yielded by the cow is accurately represented by the horizontal distance between the two vertical lines on the paper, and the rate of the milk yield is indicated by a curve marked on the sheet by the stylus during the milking.

The invention is described more in detail below, with reference to the accompanying drawings in which:

FIG. 5 is a front elevational view of a slightly modified form of the recording device illustrated in FIG. 1, showing a conventional milking machine suspended on the balance.

Figure 1:
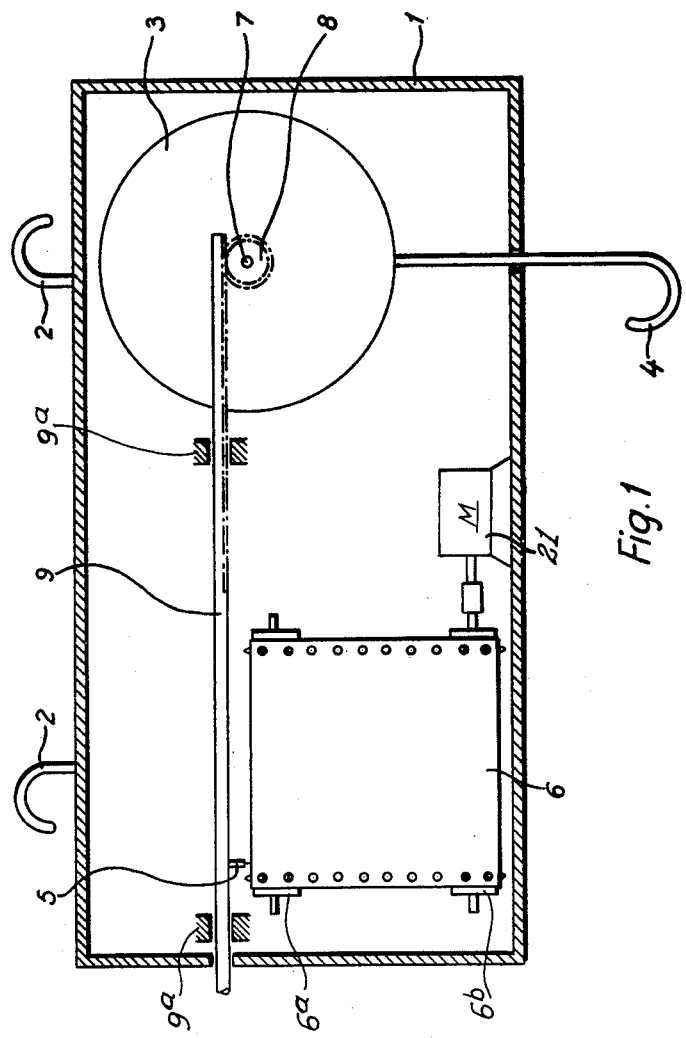
FIG. 1 is a schematic elevational view, partly in section, of an embodiment of the recording device chosen as an example.

As illustrated, the recording device comprises a frame 1 in the form of an entirely closable box. This box 1 is provided on its top with a pair of hook-like appliances 2 for suspending the box in a suitable place.

A balance 3 is mounted inside the box forming frame 1. As illustrated, the balance 3 is of the well-known spring type having a shaft 7 which is rotated clockwise by the load or weight to be measured, against the spring or biasing action, through an angle which is directly proportioned to the magnitude of the load. As will be readily understood, the shaft 7 normally carries a pointed (not shown) which indicates the weight value on a suitable scale (not shown) forming a front face of the balance; and although the pointer and scale have been removed, they could be retained as parts of the balance. Since such balances are conventional, and the details of the balance mechanism form no part of the present invention, only such parts thereof are described and illustrated as are pertinent to the present invention.

The balance 3 also includes a depending hook or load suspending means 4 projecting through a hole in the bottom of box 1. The hook serves to support the load to be weighed, which in this instance is a conventional milking machine 20 (FIG. 5).

A pinion 8 is mounted on and rotated by shaft 7 and meshes with the teeth of a rack 9, the rack being disposed in the box 1 where it is suitably mounted, as by bushings or guides 9a, for longitudinal movements. A stylus 5 is secured to rack 9 for movement therewith and is positioned to engage a paper sheet 6. The latter is provided with marginal perforations adapted to receive radially extending pins on the end portions of rollers 6a and 6b rotatably mounted in any suitable manner in the box 1. One or both of these rollers are adapted to be driven at constant speed from a suitable power source indicated generally at 21 and shown coupled to the shaft of roller 6b, so as to advance the paper 6 from a supply source (not shown) to a take-up roller (not shown). Thus, the rollers 6a–6b and constant speed power source 21 constitute means for advancing the paper 6 at constant velocity under the stylus 5, whereby the latter is operable to mark on the paper a line indicating changes per unit of time in the weight applied to hook 4. It will be understood that as the weight applied to hook 4 increases, the balance 3 through its operative connection 8–9 with the stylus 5 moves the latter to the right along the paper 6, that is, transversely to the direction of advance of the paper by rollers 6a–6b.

The milking machine 20 as shown in FIG. 5 is of the conventional type including a vessel or a pail 22 for receiving the milk, and a pulsator 23 arranged on the vessel and connected to a vacuum system 25 and also to the teat cups 28. According to an embodiment of the invention, the driving means for the rollers 6a–6b are connected to the pulsator so that the feed velocity of the sheet 6 is determined by the pulsator's impulses. Thus, the rate of advance of the sheet 6 is entirely proportional to the rate at which the pulse beats (the suctions) occur in the teat cups. According to the illustrated embodiment, the rollers 6a–6b for advancing the sheet are arranged to be driven by a power source 21 in the form of a clockwork which, in principle, brings about the same accurate feed of the sheet 6. This clockwork can be arranged for starting automatically when the balance 3 is loaded with the milking machine. The clockwork can also be provided with a starting button or the like operable manually in connection with the milking, and with another button which is manually operable to disengage the paper sheet from its drive. The milking proper should not be started before a short period of time has elapsed after applying the milking machine to the hook 4 of the balance 3. In this way, the indication provided on the paper by stylus 5 cannot be distorted by the milk remaining in the vessel or pail of the milker after a previous milking.

As shown in FIG. 5 and as previously described, the milking unit 20 is suspended by hook 4 (which is an elongated version of hook 4 in FIG. 1) and box 1 of the recording device is suitably suspended by the hook-like appliances 2.

If the recording device is to give an accurate record of the milk which is yielded by each cow, special measures should be taken. This is due to the fact that during the milking and the recording, the whole milking apparatus is hanging partly on the hook 4 of the balance and partly on the cow. The teat cups 28 are thus hanging on the cow's udder and the milking machine with its pail and pulsator is hanging on the balance hook 4, while the usual tubes or hoses 26, 27, 29 and 30 which connect the teat cups to the milking machine are carried partly by the cow and partly by the balance hook. When starting the milking, the tubes 29 and 30 are empty; but upon completion of the milking of a cow the tubes 29 and 30 are more or less filled with milk. Moreover, during the milking the tubes are subjected to pulls occasioned by motions of the cow, which pulls bring about alterations of the load on the balance 3. The balance and the stylus 5 controlled by the balance (which stylus indicates by a curve marked on the paper sheet how the cow yields its milk during the milking) will, due to the aforementioned factors, not give an accurate measure of the milk quantity obtained from each cow. In order to compensate for the errors introduced by these factors and to obtain an accurate record of the milk quantity obtained for each cow, the procedure which will now be described should be followed.

Before starting the milking, the whole milker unit 20 including the pail, pulsator, teat cups and hoses or tubes is suspended on the balance hook 4 as shown in full lines in FIG. 5, and this loading of the balance is marked on the paper sheet 6 by the stylus 5 in the form of a vertical line. This can be achieved by starting the driving means for rollers 6a–6b to set the paper sheet 6 into motion. However, since this motion is very slow, it is generally preferred to feed the paper sheet faster by hand through a distance of about 10 to 15 mm. This can be done while the roller driving means are not in operation, or while they are in operation but temporarily disconnected from the rollers 6a–6b. For this purpose, a special button (not shown) may be provided which is depressed manually to effect the disconnection of the driving means and is released to reconnect the driving means to the feed rollers.

After the paper sheet 6 has been marked with this vertical line, indicating the total weight of the milker equipment prior to the beginning of the milking, the teat cups with appurtenant hoses are lifted off the balance hook 4 (as shown by the broken lines in FIG. 5), the teat cups are applied to the cow, the milking machine is put into operation, and the power feed of the paper sheet is started if it has not already been started. Upon completion of the milking of the first cow, the teat cups with appurtenant hoses are removed from the cow and again hung on the balance hook 4, whereupon a new vertical line is recorded on the paper sheet 6 by feeding a short length of it by hand so that the stylus 5 marks the new vertical line. By reading (as with the help of a special scale) the horizontal distance between the vertical lines thus produced on the paper sheet, it is possible to obtain directly a measure in kilograms or other weight units of the total yield of milk from the cow, in spite of this milk being partly in the milker pail and partly in the teat cups and appurtenant hoses. The scale (not shown) for assisting in this reading may be mounted on the recording device and adjustable thereon so that its zero-mark can be placed exactly in front of one of the vertical lines and the reading performed exactly in front of the other vertical line.

This procedure is then repeated for the next cow. It is to be noted that in doing so it is of no importance whether or not there is milk in the teat cups and the hoses at the beginning or at the end of the procedure, since the weight of the milk yielded by each cow is always obtained with accuracy, provided that both aforementioned vertical lines are marked on the paper sheet 6 for each cow.

In addition to the aforementioned total weight of the milk yielded by each cow, the diagram made by stylus 5 on the paper 6 also shows how readily each cow yields its milk. The latter showing of the diagram is in the form of a curve which is located between the aforementioned vertical lines.

After the first vertical line has been made on paper 6 and the teat cups have been transferred from the balance hook 4 to the cow, the resulting decrease in the load on balance 3 causes the stylus 5 to be displaced to the left on the paper sheet and occupy a position showing a lower total weight at the beginning of the milking. When the milking machine is then started as well as the feeding of paper sheet 6, the stylus 5 marks a curve on the paper sheet. Since the paper sheet is fed at constant velocity, this curve indicates the rate at which the cow yielded its milk during the milking. From this diagram it is possible to discern a number of factors which are dealt with more in detail in connection with the description of FIGS. 2–4.

Figure 2:
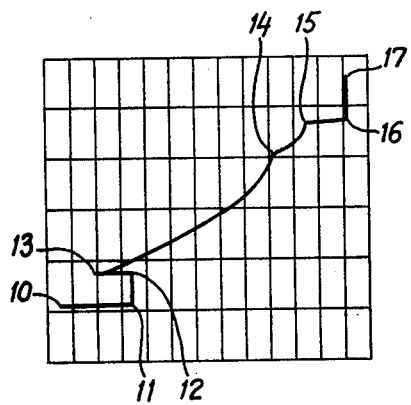
FIGS. 2, 3 and 4 are various diagrams obtained from the recording device, according to the invention, in the milking of three cows with various propensities to yield their milk.
Figure 3:
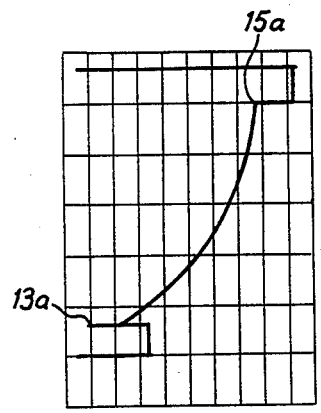
Figure 4:
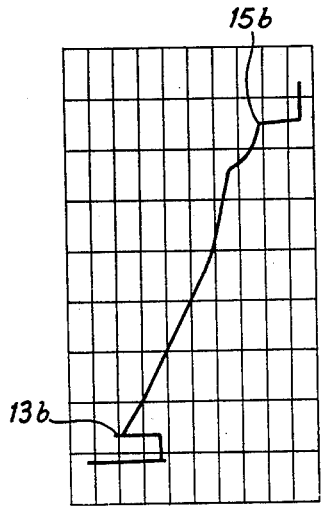

The curves or diagrams of FIGS. 2, 3 and 4 are representative, respectively, of an extremely fast-milking cow, a fairly fast-milking cow and a normal-milking cow. In FIG. 2, reference numeral 10 designates the position of the stylus 5 prior to the loading of the balance with the milking parts, and 11 designates the stylus position after all milking parts have been hung on the balance hook 4. The recording thus obtained in a horizontal line between points 10 and 11, as the paper sheet 6 is not in motion. The line between points 11 and 12 is the first vertical line obtained by a manual feed of the paper sheet. The horizontal line between points 12 and 13 marks the load reduction on the balance 3 incident to removing the teat cups with its hoses from balance hook 4 and applying the teat cups to the cow. The point 13 thus marks a smaller load on the balance than point 12. When the stylus is on point 13, the milking machine and the feed of the paper sheet are started. As the milking proceeds, the stylus marks a curve 13, 14, 15. From curve 13–14 it appears that the cow has from the beginning yielded its milk readily and constantly. Just before point 14 was reached, the rate of milk yield decreased, and at that point resort was had to so-called mechanical post-milking (the cow's udder was massaged by hand to obtain the remaining milk), as indicated by the curve 14–15. At point 15, the cow was considered as entirely milked, and the teat cups with appurtenant hoses were transferred from the cow to the balance hook 4, as indicated by marking of the horizontal line 15–16. The load applied to the balance 3 is thus higher at the point 16 than at the point 15. At point 16, the paper sheet was again manually fed to form the second vertical line 16–17.

The horizontal distance between the lines 11–12 and 16–17 corresponds to the total weight of the milk yielded and can be measured by a scale marked, for example, in kilograms or pounds. The horizontal distance between the points 13 and 15, on the same scale, would also correspond to the total weight of milk yielded, provided that the hoses and the teat cups contain the same quantity of milk before the milking as after the milking and provided that no considerations need to be given to errors due the various pulls on the hoses and the like. However, since such ideal conditions do not prevail, the latter distance is not an exact measure, and other steps must be taken to eliminate such errors. This is done by placing the whole milking unit (including the teat cups) on the balance hook 4 before and after milking of the cow, and by recording the weights by means of both aforementioned vertical lines and reading the weight as the horizontal distance between the lines. The effective milking time is read as the vertical distance between the points 13 and 15, and the total milking time as the vertical distance between the points 10 and 17. The total weight of the milker parts hung from the cow corresponds to the horizontal distance between the points 13 and 12 for the first cow milked. If several cows are to be milked in succession at the same place, the stylus is preferably made adjustable along its rack and lockable in various positions thereon, because the weight of the milk collected in the milker pail continuously displaces the stylus to the right in FIG. 1 in connection with each milking, and therefore the stylus should be set to zero between the milkings.

In FIG. 3, the curve 13a–15a is smooth, but the vertical distance between its end points is greater than in FIG. 2, which shows that the effective milking time in FIG. 3 was longer than in FIG. 2 and that the cow represented by FIG. 3 yielded its milk at a slower rate than in FIG. 2. In FIG. 4 the vertical distance between the points 13b and 15b is still greater than in FIG. 3, which shows that the cow represented by FIG. 4 was still slower to yield its milk.

It is evident that the diagram made according to the invention not only provides in a simple way, rapidly and accurately, a measure of each cow's milk production but also is a valuable means of assistance for the selection of animals which ought to be used for breeding in order to obtain fast-milking and high-producing progenies.

The invention is not limited to what is described above and illustrated on the drawing but can be modified within the scope of the following claims.

I claim:

1. A method of recording on a record sheet the yield of milk from a cow to a mechanical milking unit of the type having a milk vessel, a pulsator, teat cups and hoses connecting said cups to the pulsator and vessel, the method comprising the steps of suspending said milking unit, including the teat cups and hoses, while weighing the suspended unit together with any milk contained therein from a previous milking, to derive a total starting weight, marking on the sheet a first reference point at a first horizontal distance from a vertical reference edge of the sheet, said first point corresponding to said starting weight, removing the teat cups from said suspension and applying the cups to the cow while continuing to suspend the vessel and pulsator independently of the cow, thereby reducing the weight thus suspended independently of the cow, starting the milking unit in operation and effecting thereby a substantially complete milking of the cow into the teat cups, hoses and vessel, thereby adding milk to said reduced suspended weight, removing the teat cups from the cow and resuspending them with the vessel and pulsator while weighing the suspended unit, including the teat cups and hoses, and its contained milk and any milk in said hoses to derive a total final weight, and marking on the sheet a second reference point at a second horizontal distance from said reference edge which exceeds said first distance by an amount proportional to the difference between said total final and total starting weights, whereby the total weight of the milk yielded by the cow is represented by the horizontal distance between said first and second points.

2. The method according to claim 1, comprising also the steps of marking on the sheet a third reference point at a third horizontal distance from said reference edge, said third distance being less than said first distance by an amount corresponding to said reduction in said suspended weight, continuously weighing said reduced suspended weight together with the milk added thereto from the cow during said milking operation, starting on the sheet at the start of said milking operation a marked line beginning at said third point and extending said line horizontally away from said reference edge through a distance proportional to the increased weight derived from said continuous weighing while also extending said line a constant vertical distance per unit of time, and terminating said line on the sheet at a fourth reference point upon completion of said milking operation, whereby the vertical and horizontal distances between said third and fourth points indicate, respectively, the elapsed time of the milking operation and the weight of said milk added to said reduced suspended weight during said time, and whereby the rate at which the milk is so added is indicated by the general slant of said line on the sheet.

References Cited in the file of this patent
UNITED STATES PATENTS

| | | |
|---|---|---|
| 915,620 | Meloney | Mar. 16, 1909 |
| 2,014,357 | Klemperer | Sept. 10, 1935 |
| 2,505,552 | Koster | Apr. 25, 1950 |

FOREIGN PATENTS

| | | |
|---|---|---|
| 561,778 | Great Britain | June 5, 1944 |